Oct. 13, 1953 G. CASH 2,655,404
INSECT CATCHER FOR AUTOMOBILES
Filed Nov. 30, 1950
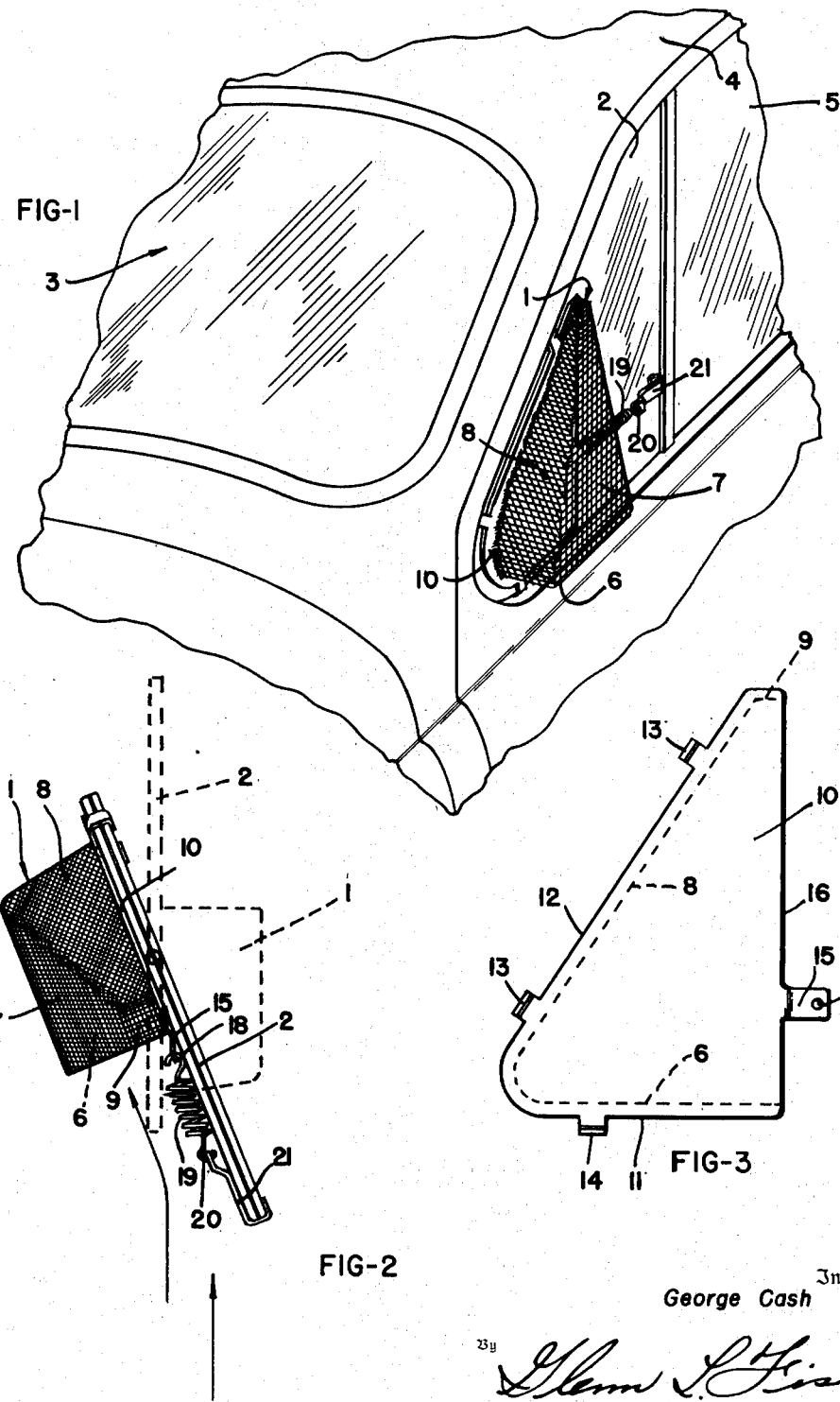
Inventor
George Cash
By Glenn S. Fish
Attorney Patented Oct. 13, 1953

2,655,404

UNITED STATES PATENT OFFICE 2,655,404

INSECT CATCHER FOR AUTOMOBILES

George Cash, Sandpoint, Idaho

Application November 30, 1950, Serial No. 198,385

1 Claim. (Cl. 296—44)

This invention relates to an insect catcher which constitutes an attachment for automobiles and serves to prevent bees, flies, and other insects from entering an automobile when the ventilators at sides of the car are turned to a position for directing air inwardly.

Another object of the invention is to provide an insect catcher of such formation that it may be very easily applied to a ventilating panel where it will be firmly held in engagement with the ventilator but may be easily removed when not needed.

Another object of the invention is to so form the insect catcher that when the ventilator panel is closed insects will be blown from the catcher and the catcher thus caused to be self cleaning.

Another object of the invention is to provide an insect catcher which is formed of wire screening and is of light weight and very strong, so that it will not be damaged by wind when an automobile to which it is applied is moving at high speed.

The invention is illustrated in the accompanying drawings wherein:

Figure 1 is a perspective view of a portion of an automobile body with its ventilator window closed and the insect catcher applied to the ventilator window.

Figure 2 is a top plan view showing the ventilator closed by dotted lines and in position to direct air into the automobile by full lines, the insect catcher being in position to catch insects.

Fig. 3 is a view of the mounting plate of the insect catcher.

The improved insect catcher is particularly intended for preventing bees, wasps, and other stinging insects from entering an automobile and stinging the driver so that he loses control of the car and thus causes it to be wrecked by leaving a road and striking a pole, tree, or the like. Many accidents have been caused in this manner and the driver and other occupants of the automobile killed or injured.

The guard, which is indicated in general by the numeral 1, is of triangular formation and is mounted against the outer surface of a ventilating panel 2 of an automobile 3. The automobile is of conventional formation and includes the usual body 4 in side portions of which the ventilating panels are pivotally mounted for turning movement about the vertical axes in front of the windows 5. When the panels 2 are closed they are disposed in the position shown in Figure 1 with the insect catcher outwardly of the ventilating panel to which it is attached. When the panels are swung to a partially opened position for causing air to be sucked out of the automobile the insect catchers carried by the panels remain outwardly of the car, but when the panels are turned to the position shown in Figure 2 and cause air to be deflected inwardly the insect catchers are disposed inwardly and they are in such position that inwardly moving air will pass through the catchers and insects which may enter the car will be caught and held in the catchers. While only one side of the automobile has been shown in the drawings and one catcher, it will be understood that the automobile has ventilating panels at opposite sides and each carries an insect catcher.

The insect catcher has a body formed of wire mesh and has a bottom 6, an outer side wall 7, and an end wall 8 which for convenience will be referred to as the front wall as it is presented forwardly when the ventilating panel is in its normally closed position. The body of the catcher is entirely open at its rear, thus providing a large entrance through which bees and other insects may enter the catcher when the ventilator is turned to a position for direcing air into the automobile and the open end of the catcher is presented forwardly. The top 9 of the catcher body is flat so that its walls 7 and 8 will be braced and the body prevented from being easily bent out of shape.

The inner side of the catcher body is closed by a metal plate 10 serving as an inner side wall and also constituting a mounting plate or panel. This plate or panel conforms to the shape of the catcher body and edges of the bottom and the wall 8 and the top 9 are soldered to the plate close to the lower edge 11 and the sloping front edge 12 thereof. This metal plate not only serves as a mounting panel for the catcher but also serves to brace and reinforce the wire mesh from which the bottom 6 and the walls of the catcher are formed and very effectively prevents the catcher from being bent if not carefully handled while it is being installed or removed or while on display in a store. Tongues extend from the front edge 12 of the plate 10 and from the lower edge 11 thereof, and these tongues are bent to form hooks 13 and 14. The hooks 13 are spaced from each longitudinally of the edge 12 and the hook 14 is disposed near the front end of the edge 11. Therefore when the catcher is applied to the ventilator panel of an automobile it may be very easily slid into position for the hooks to engage across the front edge and the bottom edge of the ventilator and hold the plate 10 in close fitting face to face engagement with the ventilator. A tongue 15 extends from the vertical rear edge 16 of the plate 10 and constitutes a stiff tab in which an opening 17 is formed to receive a hook 18 at the front end of a spring 19. The hook 20 at the rear end of the spring is engaged through an opening formed in the shank of a hook 21, thus pivotally mounting the hook and allowing it to be easily engaged across the rear edge of the ventilator panel. The spring exerts pull upon the plate 10 and causes the hooks 13 and 14 to be firmly held in engagement with the ventilator and prevents the insect catcher from being torn loose from the ventilator by the force of air passing into the automobile when the ventilator is in the position shown in Figure 2. Since the plate 10 is formed of stiff sheet material the spring may be strong enough to exert sufficient pull to hold the hooks 13 in gripping engagement with the edge of the ventilating pane 2 without distorting or tearing the wire mesh from which the walls of the trap are formed. Air may flow freely through the insect catcher as its walls are formed of wire mesh but any bees, or other flying insects, carried inwardly by incoming air will enter the catcher through the open end thereof and be retained therein by the force of the incoming air.

If insects are caught in the catcher it is merely necessary to turn the ventilating panel to its closed position and the catcher will be disposed outwardly thereof with its open end facing rearwardly and air passing through the catcher will blow the insects out of the catcher. It will thus be seen that insects carried inwardly by air striking a ventilator in the position shown in Figure 2 will be trapped in the catcher and prevented from stinging persons in an automobile and that the caught insects may be released by returning the ventilator to a closed position while the automobile is still moving forwardly. Accidents caused by a bee stinging the driver of an automobile will thus be avoided and also there will be no danger of a person being stung when the insects are released from the catcher.

Having thus described the invention, what is claimed is:

An insect catcher constituting an attachment for a ventilator window pane of a motor vehicle and comprising a body formed of stiff wire mesh and having an end wall, a bottom, and an outer side wall, the other end of the body being open for its full height and width and constituting an unobstructed entrance for the body, the bottom and the said walls having marginal edges united with each other, a flat plate of stiff sheet metal constituting an inner side wall for the body and to edges of which marginal edge portions of the said end wall and the bottom are firmly secured tongues and rigidly secured hooks integral with and extending laterally from marginal edges of said plate adjacent the bottom and the end walls at the closed end of the body and engageable across the lower edge and the front edge of the ventilating window pane, a tongue integral with and extending from the marginal edge of said plate at the open end of the body and formed with an opening, a spring having an inner end mounted through the opening in said tongue, and a hook connected with the outer end of said spring and engageable across the rear edge of the ventilating pane to hold the spring extended and thereby exert pull upon the plate transversely thereof and firmly hold the hooks at the opposite side edge of the plate in anchoring engagement with the front edge of the ventilating window pane.

GEORGE CASH.

References Cited in the file of this patent

UNITED STATES PATENTS

| Number | Name | Date |
| --- | --- | --- |
| 2,041,998 | Finley | May 26, 1936 |
| 2,331,600 | Dillow | Oct. 12, 1943 |
| 2,500,991 | Kent | Mar. 21, 1950 |
| 2,544,003 | Baggs | Mar. 6, 1951 |